Figure 1:
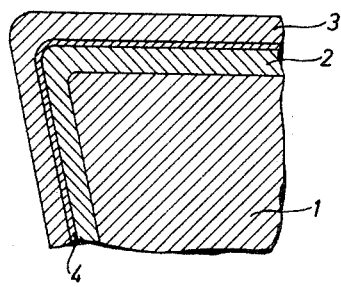

United States Patent [19]
Ohlsson

[11] 3,755,866
[45] Sept. 4, 1973

[54] INSERT FOR CUTTING OF STEEL, CAST IRON OR SIMILAR MATERIAL

[75] Inventor: Fall Johan Olof William Ohlsson, Enskede, Sweden

[73] Assignee: Sandco Limited, Ottawa, Canada

[22] Filed: May 17, 1971

[21] Appl. No.: 144,056

[30] Foreign Application Priority Data
June 26, 1970 Sweden.............................. 8872/70

[52] U.S. Cl................................................. 29/95 C
[51] Int. Cl.............................................. B26d 1/00
[58] Field of Search.................... 29/95, 95 A, 95 B, 29/95 C, 96

[56] References Cited
UNITED STATES PATENTS
3,616,506  11/1971  Ekemar................................... 29/95
2,053,977   9/1936  Taylor................................. 29/95 C
3,482,295  12/1969  Trent....................................... 29/95
2,414,231   1/1947  Kraus...................................... 29/95
3,308,859   3/1967  Ehlen...................................... 29/95
3,564,683   2/1971  Schedler................................. 29/95

Primary Examiner—Harrison L. Hinson
Attorney—Pierce, Scheffler & Parker

[57] ABSTRACT

A metal-cutting insert comprises, in addition to a body portion of sintered hard metal, a thin coating of material having higher wear resistance than the body portion, said thin coating consisting essentially of two layers of fine-grained metal carbides disposed one on top of the other, the wear-resisting coating containing no binder metal.

9 Claims, 3 Drawing Figures

Patented Sept. 4, 1973

3,755,866

INSERT FOR CUTTING OF STEEL, CAST IRON OR SIMILAR MATERIAL

The present invention relates to hard metal inserts for chipforming machining of steel, cast iron, and other machinable materials.

In such machining operations the cutting insert is generally fastened to the cutting tool by means of soldering or clamping. It may for instance consist of a plate — often having triangular or square form — which provides cutting edges between one or both end faces of the plate and its side surfaces.

It previously had been known how to apply thin layers of hard material, such for instance as carbides, on sintered hard metal in order to reach higher wear resistance in the cutting inserts. Thus, in machining steel and cast iron at relatively high cutting speeds a thin layer of titanium carbide over the basic cutting insert has been used. For machining cast iron — particularly, at low cutting speeds — it also has been proposed to use a layer of tungsten carbide on the insert. Depending on the character of the wear mechanism, the one or the other of the mentioned hard layers gives the best result.

Up to now, it has been necessary in practice to be content with a compromise, i.e., a layer of TiC, which has given very good results in cutting steel and relatively good results in cutting cast iron, particularly at high cutting speeds. It has also been proposed to use layers of mixed carbides, e.g., of (TiW)C, but in that case also it is a makeshift compromise.

A radical solution of the problem to attain an optimum useful life of the cutting tool in cutting of different materials at high speeds as well as at low speeds has now surprisingly been produced by applying to the cutting insert — or, to a portion of the cutting insert — the layers of the different hard carbides above each other.

According to the invention the coating applied on the hard metal insert consists of two extremely wear-resistant and very thin layers laid upon each other, one layer consisting of at least one extremely finegrained member of the group consisting of titanium carbide, tantalum carbide, zirconium carbide, hafnium carbide, vanadium carbide and niobium carbide, and the other layer consisting of at least one extremely fine-grained member of the group consisting of tungsten carbide, molybdenum carbide and chromium carbide.

The two layers preferably can be applied to the cutting insert body or substratum by deposition from a gaseous phase. In such case it is suitable to use respective metal halides mixed with hydrogen and hydrocarbon. In applying titanium carbide, as an example, titanium tetrachloride and hydrogen mixed with methane are generally used. The reaction usually occurs at a temperature between 700°–1100° C. and at a gas pressure between 1–100 torr (mm Hg) the gas flow mixture being caused to flow over said body within a vessel in which the deposition is effected.

Other procedures may be used for applying the double layer. It has, thus, been found advantageous to make the deposition by means of so-called sputtering. Among procedures which have given excellent results also may be mentioned evaporation and electrolytic deposition.

It has been found that a double layer, built up as mentioned, gives the same good results in steel as well as in cast iron or other metals. Among other things, the invention has thus made it possible during the life of insert to exploit at the same time on the one hand the excellent strength and base wear resistance of the tungsten carbide layer respectively the chromium or molybdenum carbide layer and on the other hand the high resistance to cratering and flank wear, particularly in cutting of steel, characteristic of the layer of titanium carbide, respectively tantalum-, zirconium-, hafnium-, vanadium- or niobium carbide. In this way it has been possible to get optimum results in cutting cast iron or similar metal at low cutting speeds or temperatures, as well as in cutting steel, cast iron or similar metal at high cutting speeds, pressures and temperatures.

The double layer coating must be extremely thin to give an increased or optimum life during highly variable cutting conditions which characterizes the cutting insert according to the invention. The two wear resistant layers, laid upon each other, shall thus each be between 1–9 $\mu$m in thickness, and generally between 1.5 and 6 $\mu$m. The thickness of each hard layer preferably should be below 5 $\mu$m and preferably exceed 2 $\mu$m. If the mentioned limits are not kept, the favorable properties will not be obtained.

According to an embodiment of the invention the coating should at least cover the cutting-edge or -edges and the connecting chip face or faces; as a rule it also covers the connecting clearance face or faces. Often it is suitable entirely to overlay the cutting body or substratum with the double layer coating of the invention.

The cutting body or substratum of the cutting insert shall consist of sintered hard metal containing at least one carbide, e.g., WC, TiC, TaC and/or NbC, besides binder metal, as e.g. Co, Ni and/or Fe. The cutting body should be formed to the desired shape before the coating is applied.

Depending upon the material cut, the kind of cutting and other conditions, optimum life of the insert is attained at different relative placings of the two layers in the coating. In many cases maximum exploitation of the insert is reached if the inner layer situated next to the cutting body per se consists of titanium carbide, tantalum carbide, vanadium carbide, zirconium carbide, hafnium carbide or/and niobium carbide and the outer layer consists of tungsten carbide, molybdenum carbide or/and chromium carbide. As an example of cutting conditions, where the mentioned formation of the coating has given optimum results, may be mentioned turning of steel and steel castings. This operation was started as rough machining at low cutting speeds and continued as fine machining at increasing and finally very high cutting speed. variable In other cases optimum life of the insert is obtained if the inner layer situated next to the cutting body consists of tungsten carbide, molybdenum carbide or/and chromium carbide and the outer layer consists of titanium carbide, tantalum carbide, vanadium carbide, zirconium carbide, hafnium carbide or/and niobium carbide. As an example of cutting operations in which the last-mentioned embodiment of the coating has given very good results may be mentioned the turning of cast iron during highly variable conditions concerning (among other things) feed and cutting speed.

It has also been found suitable, in certain cases, to apply an extremely thin layer of Co, Ni or/and Fe between the two wear-resistant carbide layers applied one over the other. In this way the toughness of the coating has been increased to an essential extent. The thickness of the thin intermediate layer should be between 0.1 and 2 $\mu$m. Sometimes it has been found advantageous to apply a thin metal layer between the hard metal substratum and the underlying layer of the double layer coating. This metal layer, consisting of e.g., Pt, Fe or Ni, usually has a thickness below 2 μm.

Wear-resistant double carbide layers according to the invention, with or without the mentioned metal layer, have also given remarkable increases of life in other sintered and coated hard metal bodies. As examples may be mentioned wear parts in machine elements or tools with extremely high demands upon wear resistance and hardness in combination with good strength.

Figure 2:
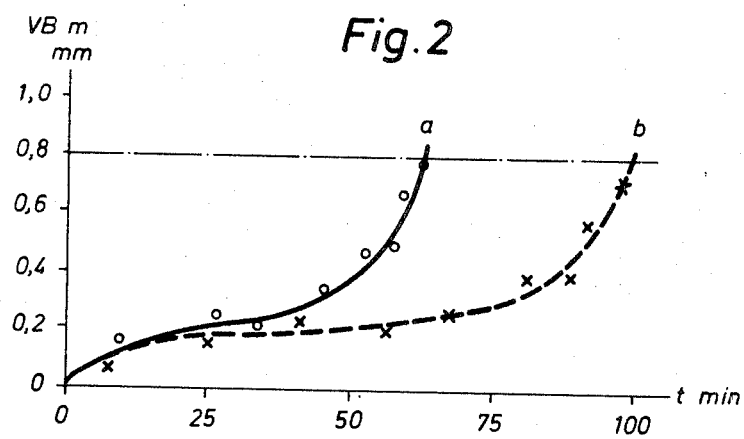
Figure 3:
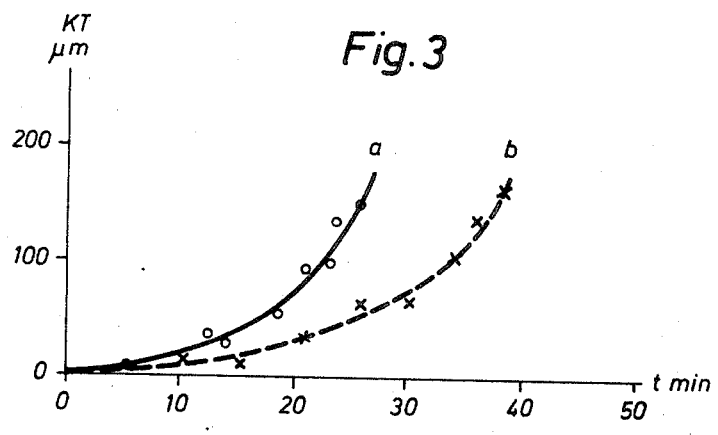

The invention will now be described in greater detail in connection with the following examples, taken in conjunction with the appended drawings in which:

FIG. 1 is a transverse section through a portion of an insert with surface coating over part of cutting edge; and FIGS. 2 and 3 are graphs showing wear as function of machining time in a turning operation.

EXAMPLE 1

The part of the insert shown in FIG. 1 consists of a cutting body 1 of sintered hard metal, upon which is applied a thin coating 2–4. The example illustrates an embodiment in which the coating consists of an inner wear-resistant layer 2 of TiC, an outer wear-resistant layer 3 of WC and a layer 4 of Co applied between the two wear-resistant layers. The thickness of the two wear-resistant layers is about 2 μm each and the thickness of the softer Co layer is about 0.5 μm. The composition in percentage by weight of the hard metal in the cutting body was: 10% Co, 70% WC and 20% cubic carbides in the form of TiC, TaC and NbC. The two wear-resistant carbide layers were deposited from a gaseous phase containing respective metal chloride ($TiCl_4$ resp. $WCl_6$) mixed with methane and hydrogen. The Co layer was applied by means of sputtering.

EXAMPLE 2

The diagram presented in FIG. 2 shows the results from cutting experiments in which an insert, coated with a single surface layer of TiC according to earlier known technique, was compared with an insert coated with a double layer consisting of TiC and WC according to the invention.

The cutting was done as turning in cast iron, on workpieces of relatively large initial diameter. The test was principally laid out as so-called orthogonal cutting, i.e., an operation with only radial feed in this case, and having constant number of revolutions of the workpiece. In that way unitary test conditions were maintained and cutting speed gradually decreased with decreasing diameter of the workpiece. The thickness of the double layer coating was the same as was the thickness of the single layer.

Cutting data:
Turning of cast iron.
Wear of tool as a function of the machining time at gradually decreasing cutting speed but otherwise constant cutting conditions:

| | |
|---|---|
| Cutting speed: | 280–25 m/min. |
| Number of revolutions: | 282 rev./min. |
| Feed: | 0.60 mm/rev. |
| Cutting depth: | 2.5 mm |
| Cutting edge angle: | 90° |

Material: Cast iron SIS 0125 with the analysis (in wt. percent):

C = 3.3 %; Si = 2.0 %; Mn = 0.8 %.

Tool material:
a. Hard metal insert with coating of TiC (single layer) with a thickness of 3.5 μm. Reference insert.
b. Hard metal insert with coating according to the invention (double layer) consisting of an inner layer of WC with a thickness of 1.5 μm and an outer layer of TiC with a thickness of 2 μm.

FIG. 2 shows the average flank wear $VB_{mean}$ as a a function of machining time "$t$." It is apparent that the tool life of the insert "$b$" coated according to the invention, is considerably higher than that of the reference insert "$a$."

EXAMPLE 3

The diagram presented in FIG. 3 shows the results of another cutting test, in which a similar comparison has been made between a hard metal insert coated with a double carbide layer according to the invention and a hard metal insert coated with a single carbide layer according to earlier known technique. As distinguished from the conditions in Example 2, the cutting was performed on steel and the double carbide layers according to the invention were applied in opposite order.

The cutting was done as turning, principally similar to Example 1, but performed as inner turning. In this way a gradually increasing cutting speed with increasing inner diameter of the workpiece was obtained at the same time as the test conditions were otherwise unitary.

Cutting data.
Turning of Steel.
Tool wear as a function of the machining time at gradually increasing cutting speed but otherwise constant cutting conditions:

Cutting speed: 50–280 m/min.
Number of revolutions: 282 rev./min.
Feed: 0.40 mm/rev.
Cutting depth: 2.0 mm
Cutting edge angle: 90°
Material: Carbon steel, make Sandvik 17 C (1% C)
Tool material: a. Hard metal insert with surface coating of TiC (single layer) with a thickness of 4 μm. Reference insert.
b. Hard metal insert with surface coating according to the invention (double layer) consisting of an inner layer of TiC with a thickness of 2 μm and an outer layer of WC with a thickness of 2 μm.

FIG. 3 shows the crater depth KT, i.e. the crater wear, as a function of the machining time "$t$." It is apparent that the tool life of the insert "$b$," coated according to the invention, is essentially longer than that of the reference insert "$a$."

I claim:
1. Insert for cutting steel, cast iron and similar material, consisting of an insert body of sintered hard metal containing at least one carbide and binder metal, and on said body a very thin coating of higher wear-resistance than that of the hard metal in the insert body, said very thin coating consisting of two wear-resistant layers disposed one over the other, the underlying layer consisting of at least one extremely fine-grained member of the group consisting of titanium carbide, tantalum carbide, zirconium carbide, hafnium carbide, vanadium carbide and niobium carbide and the outer layer consisting of at least one extremely fine- grained member of the group consisting of tungsten carbide, molybdenum carbide and chromium carbide, neither of the wear-resistant layers containing binder metal.

2. Insert according to claim 1, wherein the coating covers at least the cutting edges and connecting chip faces.

3. Insert according to claim 1, wherein the two wear-resistant layers applied upon each other have a thickness of from 1 to 9 $\mu$m, and preferably between 1.5–6 $\mu$m.

4. Insert according to claim 3, in which each of the coating layers has a thickness not greater than 5 $\mu$m but not less than 1.5 $\mu$m.

5. Insert according to claim 3, wherein the two wear-resistant layers applied upon each other each have a thickness below 5 $\mu$m and exceeding 2 $\mu$m.

6. Insert according to claim 1, wherein the two wear-resistant layers applied over the other are separated by means of an extremely thin intermediate layer of a metal of the group consisting of Co, Ni and Fe.

7. Insert according to claim 6, wherein the thickness of the thin intermediate layer is between 0.2 and 2.0 $\mu$m.

8. Insert for cutting steel, cast iron and similar material, consisting of an insert body of sintered hard metal containing at least one carbide and binder metal, and on said body a very thin coating of higher wear-resistance than that of the hard metal in the insert body, said very thin coating consisting of two wear-resistant layers disposed one over the other, the underlying layer consisting of titanium carbide and the outer layer consisting of tungsten carbide.

9. Insert as defined in claim 8, wherein the thickness of each of the underlying and outer layers is about 2.0 $\mu$m.

* * * * *